(12) United States Patent
Toub et al.

(10) Patent No.: US 8,719,803 B2
(45) Date of Patent: May 6, 2014

(54) CONTROLLING PARALLELIZATION OF RECURSION USING PLUGGABLE POLICIES

(75) Inventors: Stephen Toub, Seattle, WA (US); Igor Ostrovsky, Bellevue, WA (US); Joe Duffy, Renton, WA (US); Vance Morrison, Kirkland, WA (US); Huseyin Yildiz, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1515 days.

(21) Appl. No.: 12/132,614

(22) Filed: Jun. 4, 2008

(65) Prior Publication Data
US 2009/0320005 A1    Dec. 24, 2009

(51) Int. Cl.
*G06F 9/45* (2006.01)

(52) U.S. Cl.
USPC .......................... 717/140; 717/141; 717/149

(58) Field of Classification Search
None
See application file for complete search history.

(56) References Cited

U.S. PATENT DOCUMENTS

| | | | |
|---|---|---|---|
| 6,088,511 A | 7/2000 | Hardwick | |
| 6,292,822 B1 | 9/2001 | Hardwick | |
| 6,374,403 B1* | 4/2002 | Darte et al. | 717/161 |
| 6,895,115 B2 | 5/2005 | Tilton | |
| 7,263,695 B1 | 8/2007 | Muzaffar et al. | |
| 2003/0037321 A1 | 2/2003 | Bowen | |

OTHER PUBLICATIONS

"Making Parallel Programming Easy and Portable", http://www.cs.cmu.edu/~scandal/nesl/info.html.
Halstead Robert H. "Multilisp: A Language for Concurrent Symbolic Computation", ACM Transactions on Programming Languages and Systems, vol. 7, No. 4, Oct. 1985, pp. 501-538.
Powers David M.W. "Parallelized QuickSort with Optimal Speedup", Proceedings of International Conference on Parallel Computing Technologies. Novosibirsk. 1991, pp. 1-10.
Prechelt, et al. "Efficient Parallel Execution of Irregular Recursive Programs", IEEE Transactions on Parallel and Distributed Systems, Date: Jun. 21, 1999, vol. 13, Issue: 2, pp. 167-178.

* cited by examiner

*Primary Examiner* — Qamrun Nahar
(74) *Attorney, Agent, or Firm* — Kevin Sullivan; Kate Drakos; Micky Minhas

(57) ABSTRACT

A parallelism policy object provides a control parallelism interface whose implementation evaluates parallelism conditions that are left unspecified in the interface. User-defined and other parallelism policy procedures can make recommendations to a worker program for transitioning between sequential program execution and parallel execution. Parallelizing assistance values obtained at runtime can be used in the parallelism conditions on which the recommendations are based. A consistent parallelization policy can be employed across a range of parallel constructs, and inside recursive procedures.

20 Claims, 3 Drawing Sheets

CONTROLLING PARALLELIZATION OF RECURSION USING PLUGGABLE POLICIES

BACKGROUND

Software may be parallelized to permit faster execution, to organize workflow, to provide redundancy, and/or to support distributed processing, for example. Parallelization may involve control parallelism or data parallelism.

Control parallelism may be found in multithreaded environments and multiprocessing environments, for example. Control parallelism supports execution of two or more instruction sequences in parallel. In a multithreaded environment, for example, control parallelism supports execution of two or more threads in parallel, or by at least allows a developer to structure software in a way that facilitates parallel execution of thread instruction sequences if multiple processor cores become available.

Data parallelism supports processing two or more portions of a data set in parallel. Data parallelism therefore involves some form of control parallelism in the instructions that process the data. However, control parallelism does not necessarily involve any data parallelism. Recursion involves control parallelism when recursive calls are parallelized, and may also involve data parallelism if the recursive calls process portions of a data set in parallel.

SUMMARY

In some embodiments, a control parallelism interface supports configuration of a program for control parallelism. A parallelism policy procedure can be assigned in the program using the control parallelism interface. The parallelism policy procedure implements evaluation of a parallelism condition which is unspecified in the control parallelism interface. A policy regarding parallelization may be based on a parallelism condition involving values such as the current number of active tasks, current recursion depth, number of logical processors in the system, memory size currently available, or execution profile of a previous run. In some embodiments, an application program is configured to invoke a parallelism policy procedure within a recursive procedure in order to influence parallelism during recursion.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
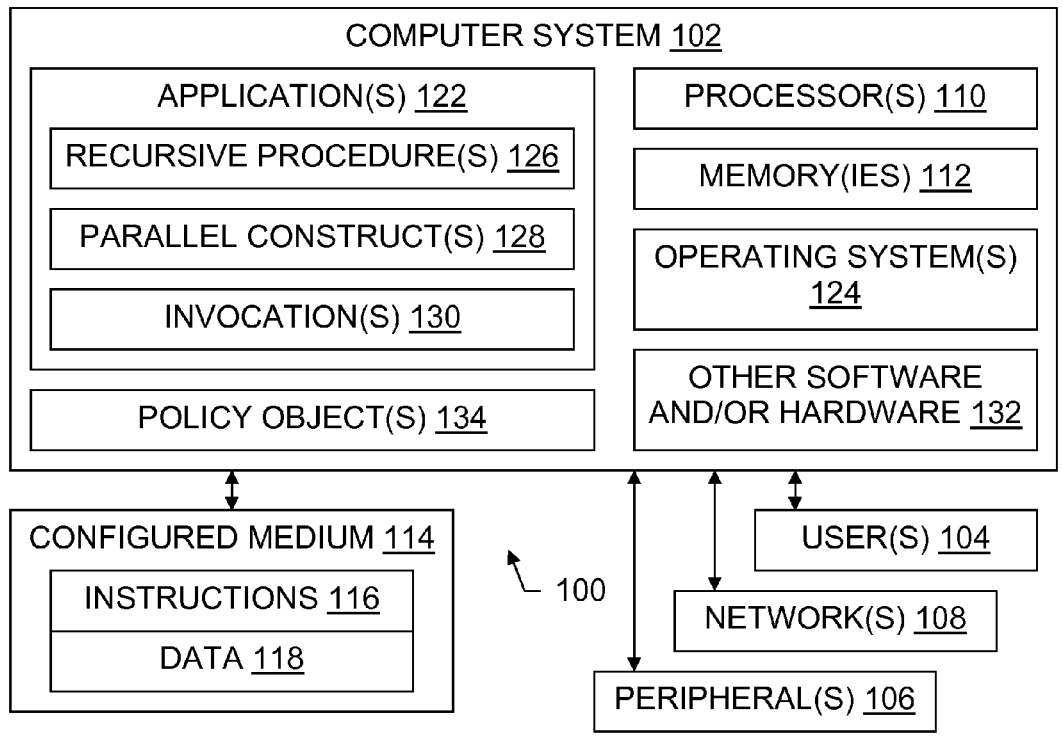
FIG. 1 is a block diagram illustrating a computer system in an operating environment, and configured storage medium embodiments.

A recursive function may call itself more than once, and do so in a way that permits parallel processing of the multiple recursive calls. Recursion may be direct or indirect. That is, a recursive function may call itself directly, or a recursive function may call itself indirectly by calling another function which calls the recursive function. Indirect recursion may involve multiple intervening functions. As an example of direct recursion, a quick sort function calls itself twice in its own body, namely, once to sort input left of a pivot, and once to sort input right of the pivot. There is no dependency between the left sort and the right sort, so the two sorts can be done in parallel. Recursive functions do not necessarily return a result; they may be called merely for the effects caused by executing statements within their bodies.

A naïve parallel implementation of a recursive function splits the work into independently executed portions, such as threads, at each recursive call. Unfortunately, this naïve implementation creates significant performance overhead because creating and scheduling each thread has a performance cost. More generally, the extra work for parallelism will almost always add some amount of overhead, even in optimally-implemented frameworks; creating threads is just an example. This naïve implementation also depletes resources, because each thread requires part of a limited resource such as memory. Indeed, a pool of available threads may have a fixed maximum size. Performance overhead and resource depletion can severely limit the amount of input data one can process using a naïve parallel implementation.

One modification of the naïve parallel implementation splits the processing for parallel execution only until a certain recursive depth is reached, at which point the rest of the processing is done sequentially. This modification limits the number of threads created, thereby limiting both the performance overhead and the resource depletion of the naïve implementation. However, this modification also has disadvantages. The transition from parallel processing to sequential processing is static. That is, the transition point from parallel to sequential processing is set before processing begins, so information collected during execution cannot be used to decide when parallel processing is desirable. Changing the transition point is also hard, because the code implementing the parallelization logic is entangled with the code executing the recursive function. Moreover, this modification fails to integrate recursion parallelization with other parallel constructs, such as parallel loops, fork-join parallel blocks, and so on.

Some embodiments discussed herein address the foregoing by allowing a developer to make pluggable parallelism policy procedures part of the input that is given to a sort routine or any other input processing routine. The embodiments allow dynamic decisions about whether portions of such processing routines should be executed in parallel. That is, transitions between parallel processing and sequential processing can be made during program execution, in either direction (parallelto-sequential, sequential-to-parallel), and transitions may be based on values that become available only during runtime. Moreover, a consistent parallelization policy can be used in recursive calls, in parallel loops, and in other parallel constructs. For example, a user-developed parallelization policy procedure may be applied to a variety of recursion frameworks.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/ or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

Whenever reference is made to data or instructions, it is understood that these items configure a computer-readable memory, as opposed to simply existing on paper, in a programmer's mind, or as a transitory signal on a wire, for example.

Operating Environments

With reference to FIG. 1, an operating environment 100 for an embodiment may include, for instance, a computer system 102, which may be multithreaded or not, and multiprocessor or not. It is expected that code with control parallelism features discussed herein will often be run on systems that are multithreaded and/or multiprocessor. But it should also be appreciated that development of such code can be done at least in part on non-multithreaded non-multiprocessor systems, and the definition of computer systems 102 accordingly allows, but does not require, multithreading and/or multiprocessing.

An operating environment may include one or more computer systems, which may be clustered, client-server networked, and/or peer-to-peer networked. Some operating environments include a stand-alone (non-networked) computer system.

Human users 104 may interact with the computer system 102 or with another computer system in an embodiment by using screens, keyboards, and other peripherals 106. A software developer is understood to be a particular type of user 104; end-users are also considered users 104. Storage devices and/or networking devices may be considered peripheral equipment in some embodiments. Other computer systems (not shown), which may themselves be multithreaded or not, and multiprocessing or not, may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system 102 when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. For clarity of illustration, memories 112 are shown in a single block in FIG. 1, but it will be understood that memories may be of different physical types, and that applications 122 and other items shown in the Figures may reside partially or entirely within one or more memories 112, thereby configuring those memories.

In a given operating environment, the computer system 102 or another computer system may run one or more applications 122, may run an operating system 124, and may use any network interface equipment, now known or hereafter formed. In particular, applications 122 may be embedded. Applications 122 and other software suitable for use with or as part of an embodiment may contain recursive procedures 126, that is, procedures which call themselves. Applications 122 and other software suitable for use with or as part of an embodiment may contain parallel constructs 128 such as parallel loops, parallel for-join blocks, and certain recursive procedures (those susceptible to parallel execution). Applications 122 and other suitable software also may contain invocations 130 of various procedures, as discussed herein. Other software and/or hardware 132 not expressly named above may also be present in a given configuration.

A policy object 134 provides control parallelism capabilities in some embodiments. Policy objects 134 are discussed in detail in connection with FIGS. 2 through 6.

Some of the suitable operating environments for some embodiments include the Microsoft®.NET™ environment (marks of Microsoft Corporation). In particular, some operating environments are expected to include Parallel Extensions (PFX) to the .NET Framework for covering data parallel components such as Parallel LINQ (PLINQ) or Task Parallel Library (TPL), to allow custom parallel policy objects in Parallel Extensions itself, for the .NET Framework, and for end-developer code. Some suitable operating environments include Java® environments (mark of Sun Microsystems, Inc.), and some include environments which utilize languages such as C++ or C# ("C-Sharp").

Systems

Referring now to FIGS. 1 through 5, some embodiments include a computer system configured with a control parallelism interface 202 and one or more parallelism policy procedures 204 which implement the interface 202. The control parallelism interface and the parallelism policy procedures 204 may be provided as aspects of a policy object 134. These components and others are discussed in greater detail below.

Some embodiments include a configured computer-readable storage medium 114, which is an example of a memory 112. Memory 112 may include disks (magnetic, optical, or otherwise), RAM, EEPROMS or other ROMs, and/or other configurable memory. A general-purpose memory 112, which may be removable or not, and may be volatile or not, can be configured into an embodiment using components such as a control parallelism interface 202 and a parallelism policy procedure 204, in the form of corresponding data 118 and instructions 116, read from a removable medium 114 and/or another source such as a network connection, to thereby form a configured medium in the form of configured memory 112 which is capable of causing a computer system to perform method steps for configuring software and/or for providing control parallelism policy capabilities as disclosed herein. FIGS. 1 through 5 thus help illustrate configured storage media embodiments and method embodiments, as well as system embodiments.

In some embodiments, peripheral equipment such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Figure 2:
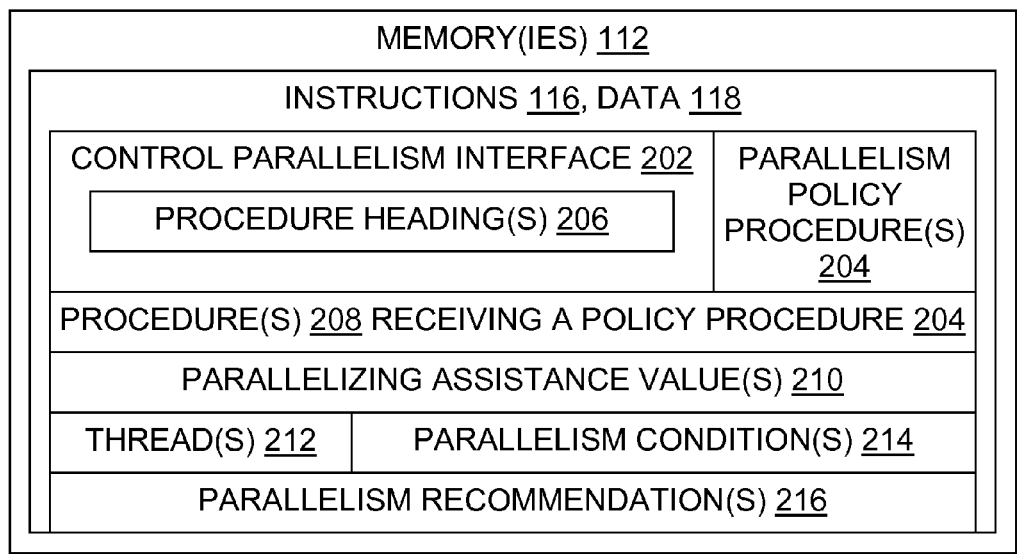
FIG. 2 is a block diagram further illustrating a computer system memory configured with a control parallelism interface, parallelism policy procedures, and other items related to parallelism.

As illustrated in FIG. 2, a computer system 102 may be configured with a control parallelism interface 202 and a parallelism policy procedure 204. The control parallelism interface 202 includes procedure headings 206 by which parallelism policy procedures 204 are assigned, guided, and otherwise utilized. Software such as an application 122 or an operating system 124 which utilizes the parallelism policy procedures 204 may be configured to do so by containing one or more worker procedures 208 which are configured to receive parallelism policy procedures 204 as parameters.

Also present in the illustrated configuration are one or more parallelizing assistance values 210, which can be used by a parallelism policy procedure 204 which is evaluating a parallelism condition 214 to identify desired transition points between parallel and sequential processing. In particular, and without excluding other approaches, a parallelism policy procedure 204 may base a dynamic parallelism recommendation 216 on parallelizing assistance values 210 that become available during runtime.

Some examples of parallelizing assistance values 210 include: current number of active tasks, current nesting depth, number of logical processors in the system, system memory amount currently available, execution profile of a previous run, time of day, number of processes currently running, number of threads on the system or in the current process, current and/or past CPU utilization, results of code analysis to speculate on future numbers of active tasks, trace information from this or other running applications, and hints from the user pertaining to the importance of parallel processing or the availability of parallel processing at a given point during program execution. As used here, "active" tasks not only include any tasks currently running but also any tasks that have been created but that not yet started executing; blocked tasks are excluded. Although tasks are used as an example, threads may also be used with some embodiments. In particular, the number of active threads may be a parallelizing assistance value.

The recommendations 216 given by parallelism policy procedures 204 are not necessarily mandatory. Within software such as applications 122, operating systems 124, and other software that utilizes parallelism policy procedures 204, however, threads 212 may be created, avoided, or terminated to provide parallelism, based at least in part on a parallelism recommendation 216.

One example of a control parallelism interface 202 is the following:

```
public class ParallelPolicy
{
    // Limits the parallelism so that there are no more
    // than maxActiveTasks active tasks at any point
```

-continued

```
    public static ParallelPolicy
            NewMaxActiveTasksPolicy(int maxActiveTasks);
    // Limits the parallelism so that no more than
    // maxDepth parallel constructs are nested at any
    // particular time.
    public static ParallelPolicy
            NewMaxDepthPolicy(int maxDepth);
    // Limits the parallelism according to a user
    // predicate. The predicate is invoked each time a
    // parallelization decision needs to be made.
    public static ParallelPolicy
            NewCustomParallelPolicy<TArgument>(Func<bool>
parallelDecider);
    }
```

The foregoing example encapsulates a parallelization policy object 134 in a C-Sharp abstract class named ParallelPolicy. All parallel policies are then represented as classes derived from the abstract class ParallelPolicy. The static methods of ParallelPolicy instances are used to construct various types of parallel policy implementations. A user 104 creates an instance of a particular parallel policy procedure 204 using NewMaxDepthPolicy( ), for example, and then passes the instance into various parallel constructs. This class definition shows methods used to instantiate a ParallelPolicy (e.g. the factory methods for creating a ParallelPolicy with a certain configuration). Other methods could allow the framework using the policy to examine the policy to determine whether more parallelism should be introduced and to inform the policy when more parallelism has been introduced, as discussed below in connection with:

public bool NeedsMoreParallelism {get;}
public void RegisterData (object data);

Program code examples given herein do not describe all possible embodiments. Embodiments are not limited to the specific program code provided herein. A given embodiment may include additional program code, different program code, code written in a different programming language, and/or otherwise depart from the examples provided.

Figure 3:
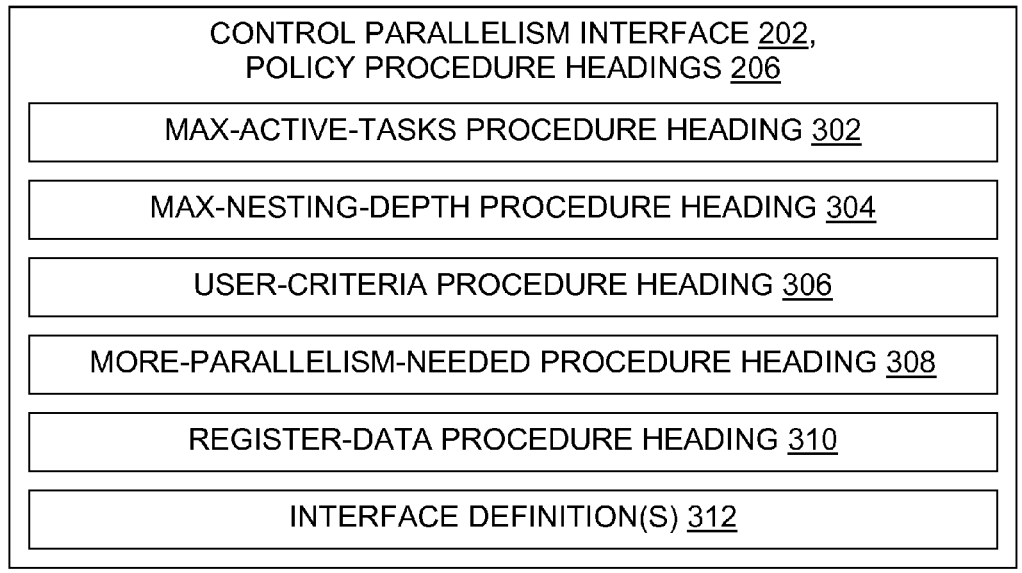
FIG. 3 is a block diagram further illustrating a control parallelism interface.

As illustrated in FIG. 3, some embodiments of a control parallelism interface 202 include one or more procedure headings which are designated within the interface 202 as procedure headings 206.

Procedure headings in general may be implemented as method signatures, type signatures, procedure specifications, method declarations, or the like. Procedure headings provide information such as the name of a function or other software routine, the parameters expected by the routine, and the value if any returned by the routine.

FIG. 3 shows several possible procedure headings 206 specifically designed for a control parallelism interface 202.

A max-active-tasks procedure heading 302 defines an interface to one or more routines designed to provide a parallelism recommendation 216 based at least in part on the number of tasks active at a given point during software execution. ParallelPolicy.NewMaxActiveTasksPolicy( ) is an example of a max-active-tasks procedure heading 302.

A max-nesting-depth procedure heading 304 defines an interface to one or more routines designed to provide a parallelism recommendation 216 based at least in part on the nesting depth at a given point during software execution. ParallelPolicy.NewMaxDepthPolicy( ) is an example of a max-nesting-depth procedure heading 304.

A user-criteria procedure heading 306 defines an interface to one or more routines designed to provide a parallelism recommendation 216 based at least in part on one or more user-defined (e.g., application-program-developer-defined) criteria at a given point during software execution. ParallelPolicy.NewCustomParallelPolicy( ) is an example of a multiple-criteria procedure heading 306.

A more-parallelism-needed procedure heading 308 defines an interface to one or more routines designed to provide a parallelism recommendation 216 based at least in part on implementation-specific criteria which are not necessarily disclosed outside a parallelism support library. For example, a parallelism recommendation 216 might be based on proprietary information about processing within a library that is provided commercially only in object code or executable code format.

A register-data procedure heading 310 defines an interface to one or more routines designed to provide a mechanism for storing variable values or other state information to be used by a user-defined procedure to formulate a parallelism recommendation 216.

An interface definition 312 provides an interface to code designed to assign a factory method as a parallelism policy procedure 204. The interface definition 312 may include a C-Sharp class or a C-Sharp interface, for example. More generally, the interface definition 312 may be present in embodiments written in C-Sharp, Java, or other languages that have class or interface programming constructs. The interface definition 312 may contain one or more procedure headings 206, and may include variables.

Likewise, variables may be used in addition to, or in place of, procedure headings 302, 304, 306, 308, 310 in some embodiments. However, in a language such as C-Sharp or Java, keeping the control parallelism interface 202 free of assumptions about any specific parallelism condition 214 may be accomplished most easily in some cases by using procedure headings rather than using other approaches.

Figure 4:
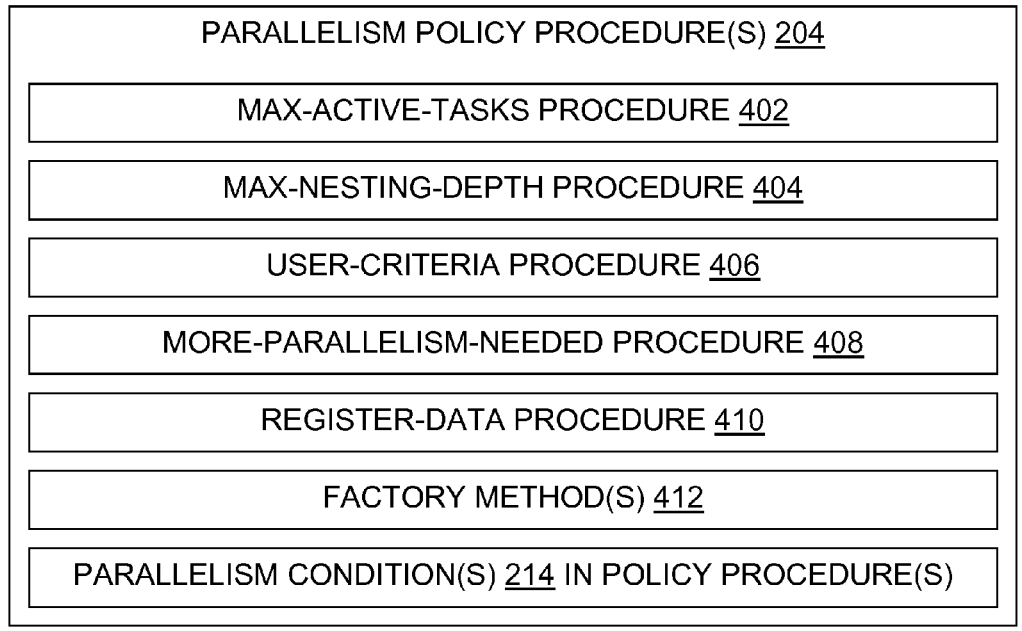
FIG. 4 is a block diagram further illustrating parallelism policy procedures.

FIG. 4 shows some of the possible parallelism policy procedures 204 and other implementing code for the control parallelism interface 202. Unlike the interface 202, the implementing code includes specific parallelism conditions 214 to be evaluated. A given control parallelism interface 202 may have more than one corresponding parallelism policy procedure 204, over time or at a given time. The specific parallelism conditions 214 on which parallelism recommendations 216 are based are unspecified in the control parallelism interface 202 but specific in the code of a parallelism policy procedure 204.

A max-active-tasks procedure 402 implements a routine which provides a parallelism recommendation 216 based at least in part on the number of tasks active at a given point during software execution. A task may be defined in a given embodiment as a thread, as a family of threads having a common ancestor, or in any other manner deemed suitable by a developer. A task may also be represented as a procedure that a thread executes, where that thread continually examines queues for procedures to execute, and where other threads are adding procedures to those queues.

A max-nesting-depth procedure 404 implements a routine which provides a parallelism recommendation 216 based at least in part on the nesting depth, e.g. in a recursion, at a given point during software execution.

A user-criteria procedure 406 implements a routine which provides a parallelism recommendation 216 based at least in part on (and hence using) one or more user-defined criteria at a given point during software execution. In particular, and without excluding other possibilities, a user-criteria procedure 306 may combine values obtained from operating system 124 calls, such as the number of processors 110 or the number of active tasks, with one or more parallelizing assistance values 210 provided by an application program in an invocation 130 of the user-criteria procedure 306.

In some embodiments, the user-criteria procedure 406 implements a parallelism condition that is based on at least one of the following values in the system: number of logical processors, total memory capacity, amount of available memory. ParallelPolicy.NewCustomParallelPolicy( ) could be used to assign a policy that evaluates a parallelism condition based on one or more of these values, for example.

A more-parallelism-needed procedure 408 implements a routine which provides a parallelism recommendation 216 based at least in part on implementation-specific criteria which are not necessarily disclosed outside a parallelism support library.

More generally, a policy object 134 may provide an application 122 or other software with the ability to use a more-parallelism-needed procedure 408 or the like to query the policy object directly as to whether more parallelism is required, e.g., with code such as the following:

```
if (policy.MoreParallelismNeeded( ))
{
    ... // do things in parallel
}
else
{
    ... // do things sequentially
}
```

An application 122 might need a way to inform a policy object 134 of changes in the application's execution environment or within the application 122 itself. If the policy procedure 204 can query system information (such as the current CPU utilization or the number of queued tasks), then a way for the application to update the policy object might not be needed. But if the policy object 134 formulates parallelism recommendations 216 based on custom information, then the necessary custom information will need to be provided to the policy object 134 using some mechanism.

One possible mechanism includes having the policy object 134 invoke a function which was given to the policy object when the policy object was constructed:

```
var policy = new CustomPolicy(myFunction);
...
bool MyFunction( )
{
    ... // return true if more parallelism needed; otherwise
    false, all based on information available to the function
    directly
}
```

Another possible mechanism includes the CustomPolicy acting as a bag containing all of the relevant state information necessary for myFunction to make its decision. In that case, the policy would need a mechanism for storing information into it, such as:

```
if (policy.MoreParallelismNeeded)
{
    ...
    policy.RegisterData(...);
}
else
{
    ...
}
```

Accordingly, a register-data procedure 410 in some embodiments implements a routine which provides a mechanism for storing state information to be used by a user-defined policy procedure 204 to formulate a parallelism recommendation 216.

In some embodiments, factory methods 412 can be assigned as parallelism policy procedures 204, using the interface definition 312.

The items discussed herein can be combined in various ways. As an example, some embodiments provide a computer system 102 configured for parallel processing and including: at least one memory 112 configured with executable instructions 116; a plurality of logical processors 110 configured to execute at least a portion of the instructions in parallel on different logical processors; a control parallelism interface 202 configuring the memory, the control parallelism interface including at least one procedure heading 206 for assigning a parallelism policy procedure 204 which implements a parallelism condition 214; and an application program configuring the memory and including a parallelism policy procedure assigned using the control parallelism interface. The parallelism condition 214 is unspecified in the control parallelism interface, but the parallelism policy procedure contains instructions 116 that specify the parallelism condition 214. That is, the interface methods for creating parallelism policies are abstracted from the implementation of those policies.

A parallel engine, for example, may use recommendations 216 from the policy when determining which parallel constructs should execute in parallel and which should execute sequentially. In one embodiment, parallelism recommendations 216 generated by policy objects 134 are obtained for use in a parallel processing library, such as one of the Microsoft Parallel Extensions for .NET parallel processing support libraries, e.g., the Microsoft Parallel LINQ (PLINQ) library or Task Parallel Library (TPL), suitably modified as taught herein.

As another example, the following code sample uses a parallel policy object 134 to implement a parallel tree walk in C-Sharp, using the Microsoft PFX Parallel.Do procedure:

```
private static void TreeWalk<T>(
    Tree<T> tree,
    Action<T> action,
    ParallelPolicy policy)
{
    if (tree != null)
    {
        Parallel.Do(
            policy,
            delegate
            {
                TreeWalk (tree.Left, action, policy);
            },
            delegate
            {
                TreeWalk(tree.Right, action, policy);
            },
            delegate
            {
                action(tree.Data);
            });
    }
}
```

In the foregoing example, if the policy object 134 determines that the recursive procedure 126 invocations are not being executed at an appropriate place to parallelize, then Parallel.Do executes its statements sequentially. Otherwise, Parallel.Do executes the statements independently in parallel, provided that a sufficient number of logical processors are available.

More generally, users 104 can provide any parallelization policy they would like. In some embodiments one calls a factory method, e.g., in ParallelPolicy, to construct an instance of the desired policy type, and passes the instance as a parameter to the worker procedure, e.g., the TreeWalk( ) method. Consequently, the decision which parallel constructs 128 should execute sequentially and which should execute in parallel is decoupled from the worker code, e.g., the tree traversal algorithm.

Some embodiments are configured to let an application 122 interact with the policy object 134 directly, rather than relying on existing or modified parallel constructs. For example, a parallelism policy object 134, or equivalently a parallelism policy procedure 204, can be passed as a parameter to a TreeWalk( ) worker procedure 208:

```
        public void TreeWalk(Tree t, ParallelPolicy p)
{
    if (p.MoreParallelismIsNeeded)
    {
        p.RegisterData(//...data for ParallelPolicy to use in
call to MoreParallelismNeeded);
        ... // recur using parallelism
    }
    else
    {
        ... // recur w/o using parallelism
    }
}
```

For example, in the case of a ParallelPolicy for depth, when calling recursively, RegisterData can be passed +1 on entrance and −1 on exit from the recursive call; the ParallelPolicy would store a thread-local variable with a count of all the values passed to RegisterData, and MoreParallelismNeeded would return true if that count was less than some threshold, or false if it was greater than it.

A user 104 such as a developer can pass the same instance of a parallelization policy into different parallel constructs in different parts of the code. The parallelization policy is then applied consistently across all of the parallel constructs 128.

As an example, consider code that contains a parallel for-loop and a parallel fork-join-block, and suppose these two parallel constructs 128 share the same parallel policy instance. If both parallel constructs are in use (on a call stack or otherwise) at a particular time, then they are both considered when the policy object 134 decides at that time whether to parallelize work further. If the parallelism policy limits the maximum nesting level, e.g., if it is a policy procedure 204 constructed by the NewMaxDepthPolicy method, then occurrences of both the parallel for-loop and the parallel fork-join-block on the stack will count towards the current nesting depth.

As illustrated by the TreeWalk( ) examples, but not limited to them, in some embodiments an application includes a recursive procedure 126 which is configured in the memory to invoke a parallelism policy procedure 204. More generally, in some embodiments an application program includes a worker procedure 208 (not necessarily recursive) which is configured in the memory to receive a parallelism policy procedure 204 as a parameter.

Figure 5:
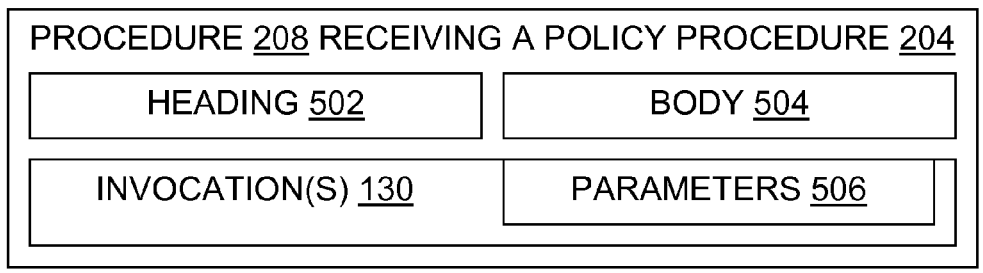
FIG. 5 is a block diagram illustrating a procedure which receives a parallelism policy procedure as a parameter.

As illustrated in FIG. 5, a worker procedure 208 which receives a policy procedure 204 (or equivalently, which receives a policy object 134) as a parameter has its own procedure heading 502, as well as a procedure body 504 and one or more parameters 506. For example, consider the TreeWalk( ) example above, which is reproduced below with line numbers added:

1) public void TreeWalk(Tree t, ParallelPolicy p)

```
1)      public void TreeWalk(Tree t, ParallelPolicy p)
2)      {
3)          if (p.MoreParallelismIsNeeded)
4)          {
5)              p.RegisterData( );
6)              ... // recur using parallelism
7)          }
8)          else
9)          {
10)             ... // recur w/o using parallelism
11)         }
12)}
```

In this example, the worker procedure 208 is TreeWalk( ), the worker's procedure heading is given on line 1, and the worker's procedure body is given on lines 2 through 12. The worker's parameters 506 are t of type Tree, and p of type ParallelPolicy. ParallelPolicy is a policy object 134 suitably defined by a developer, with a control parallelism interface that exposes at least two methods, namely a more-parallelism-needed procedure heading 308 (or equivalently a variable) named MoreParallelismisNeeded, and a user-criteria procedure heading 306 named RegisterData.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Methods Overview

Figure 6:
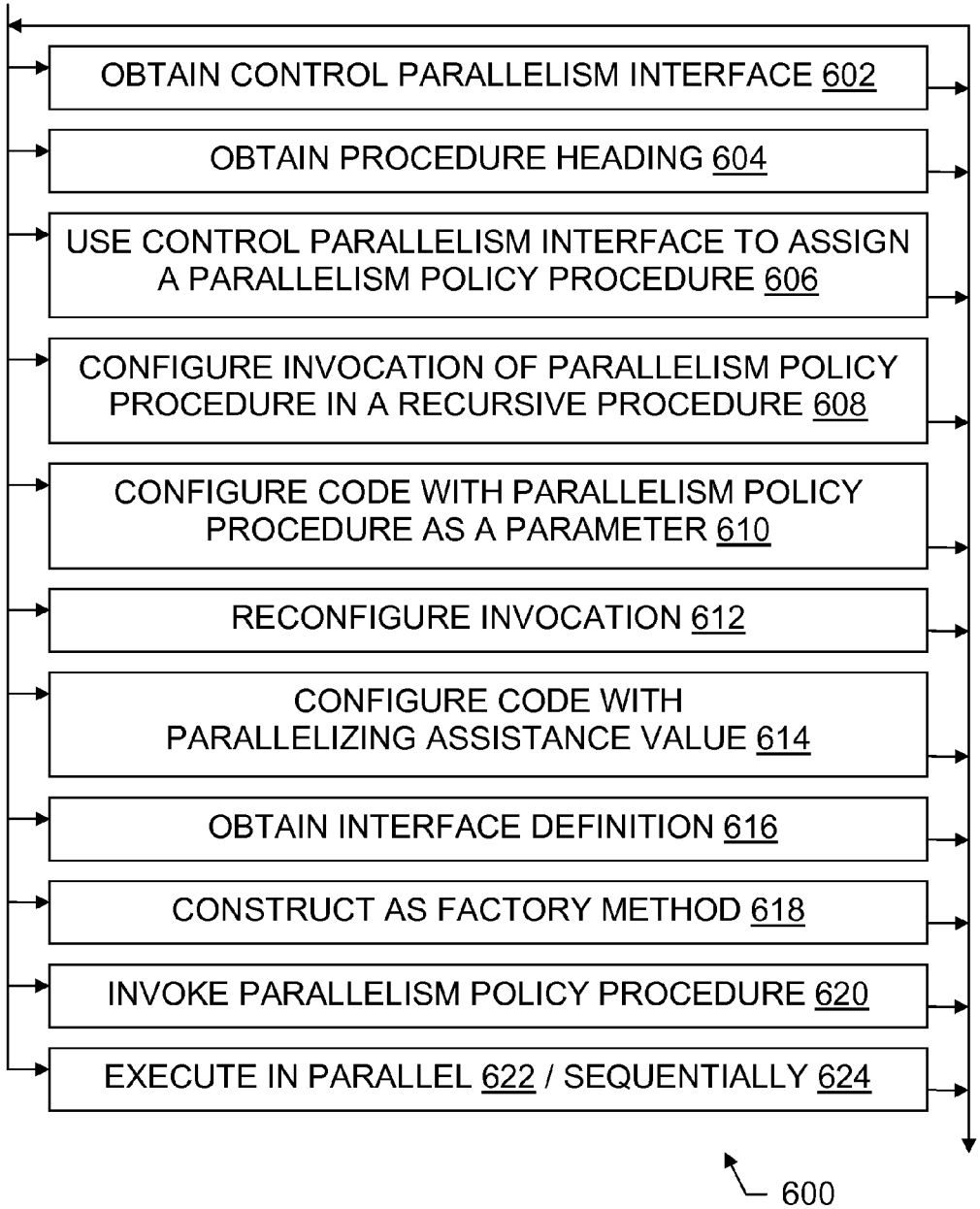
FIG. 6 is a flow chart illustrating steps of some method and configured storage medium embodiments.

FIG. 6 illustrates some method embodiments in a flowchart 600. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 600 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a control parallelism interface obtaining step 602, a software developer (or code acting on behalf of a developer) obtains a control parallelism interface 202, such as public class ParallelPolicy, for example. Obtaining step 602 may be accomplished by including a file containing code which implements the control parallelism interface 202, by linking such a file, by loading such a file, or by any mechanism for bringing software capabilities into an environment or into a particular program.

During a procedure heading obtaining step 604, a developer or an environment obtains a procedure heading 206. Procedure heading obtaining step 604 may coincide with interface obtaining step 602, but it will also be appreciated that by obtaining 602 a control parallelism interface 202 one may in some cases thereby obtain 604 several procedure headings 206.

During a using step 606, a control parallelism interface 202 is used to assign a parallelism policy procedure 204 to a procedure heading 206. Assignment may be accomplished, for example, by calling a factory method to construct a policy procedure instance:

MyPolicy=new ParallelPolicy.NewMaxActiveTasksPolicy(2);

More generally, using step 606 may be accomplished by instantiating a class, by constructing 618 a factory method, by linking, by setting address pointers for routines, or by any other mechanism for associating a procedure 204 having a body with a procedure heading 206 so that an invocation 130 based on the procedure heading passes control (and in some cases may also pass parameters) to a procedure body that implements evaluation of a parallelism condition 214. A given procedure heading 206 may be assigned different parallelism policy procedures 204 at different locations or times in a system.

During a recursive procedure invocation configuring step 608, a developer configures an application or other worker code to invoke a parallelism policy procedure inside a recursive procedure 126. After the code is configured, invocation of a routine may be accomplished using mechanisms that pass control to the routine, and may include passing parameters into the routine. In the TreeWalk( ) examples, a developer configured 608 code to invoke a policy object 134, or equivalently, a policy procedure 204 inside the recursive TreeWalk( ) procedure.

During a policy-as-parameter configuring step 610, a developer configures an application or other worker code with a procedure invocation 130 in which a parallelism policy procedure 204 is passed as a parameter to another procedure 208. In the TreeWalk( ) examples, a developer configured 610 code to pass a policy object 134, or equivalently, a policy procedure 204, as a parameter to the TreeWalk( ) worker procedure 208.

During a reconfiguring step 612, an invocation 130 is reconfigured to change which policy procedure 204 is passed into a worker procedure 208. That is, a worker procedure 208 receives the parallelism policy procedure 204 as a parameter in an invocation 130. The worker procedure has a heading 502 of its own (not to be confused with a control parallelism interface procedure heading 206), and the worker procedure has a body 504. The reconfiguring step 612 alters the invocation 130 to pass the worker procedure a different parallelism policy procedure 204, without altering the body 504 of the worker procedure 208.

During a parallelizing assistance value configuring step 614, software is configured with one or more parallelizing assistance values 210. The software may be configured to use the values 210 as parameters to a parallelism policy procedure 204 and/or as part of a parallelism condition 214, for example. Individual policy instances can be configured with different values, so multiple policies of the same type can exist simultaneously, each configured differently.

During an interface definition obtaining step 616, an interface definition 312 is obtained by a developer, or by code acting on behalf of a developer. Step 616 may be accomplished using mechanisms noted above in connection with control parallelism interface obtaining step 602.

During a constructing step 618, a parallelism policy procedure 204 is constructed as a factory method 412. This occurs in software using a language which supports factory methods, such as C-Sharp or Java.

During a parallelism policy procedure invoking step 620, a parallelism policy procedure 204 is invoked. The procedure 204 may be invoked in order to obtain a parallelism recommendation 216, or in order to provide parallelizing assistance values 210 for use in evaluating a parallelism condition, for example.

During an executing-in-parallel step 622, execution of instructions 116 in an application 122, operating system 124, or other software proceeds at least partially in parallel on one or more logical processors 110. During an executing-sequentially step 624, execution of instructions 116 proceeds sequentially on a single logical processor 110.

Configured Media

Some embodiments provide a storage medium configured with computer data and computer instructions, such as data 118 and instructions 116, for performing a method of guiding control parallelism as discussed herein. The storage medium which is configured may be a memory 112, for example, and in particular may be a removable storage medium 114 such as a CD, DVD, or flash memory.

Some embodiments provide a storage medium 114 configured with computer data and computer instructions for obtaining 602 a control parallelism interface 202, namely, obtaining a procedure heading 206 for assigning a parallelism policy procedure 204 which implements a parallelism condition 214 that is unspecified in the control parallelism interface; using 606 the control parallelism interface to assign a parallelism policy procedure in an application 122; and invoking 620 the parallelism policy procedure during execution of the application program. The assigned parallelism policy procedure has instructions 116 which specify the parallelism condition that was left unspecified in the control parallelism interface 202.

In some embodiments, the method includes executing instructions to invoke 620 a given parallelism policy procedure within at least two different parallel constructs 128. For example, a parallel loop and a parallel fork-join block could both invoke the same policy procedure 204. In some embodiments, the parallelism policy procedure is invoked 620 during execution of a recursive procedure 126.

In some embodiments, the interface obtaining step 602 obtains multiple procedure headings for policy procedures which implement respective parallelism conditions that are unspecified in the control parallelism interface. For example, the ParallelPolicy interface 202 includes procedure headings 206 for three policy factory methods: NewMaxActiveTasksPolicy( ), NewMaxDepthPolicy( ), and NewCustomParallelPolicy( ). These embodiments include using 606 the control parallelism interface to assign multiple parallelism policy procedures in an application 122 or other program. Each of the assigned parallelism policy procedures has instructions which specify a respective parallelism condition 214.

In some embodiments, the parallelism policy is an advisor whose advice may be safely ignored. For example, although in some cases an embodiment executes 622 a portion of a program in parallel in accordance with a recommendation 216 favoring parallelism, in other cases the same or another embodiment executes 624 sequentially despite a recommendation 216 indicating that parallelism is available or even desirable.

In some embodiments, a policy instance can be used to create a new policy instance, one to be used with recursive calls. For example, rather than passing a policy instance to recursive calls, one could call policy.GetRecursiveCallPolicy( ) which would return another policy instance to be passed to the children. This returned policy could be the same instance, or it could be a new instance. For example, the ParallelPolicy used for max depth could internally store a counter that records the depth. Calling GetRecursiveCallPolicy would examine the current depth. If the current depth is below a threshold, a new ParallelPolicy for max depth is returned with an incremented count (e.g. if the previous policy had a count of five, this new policy instance would have a count of six); if the current depth is at or above the threshold however, the call would just return the same instance (thereby saving memory usage and the like). In this fashion, individual policy instances would not need to track values across multiple threads, since each policy instance could be immutable and representative of a particular call frame.

More generally, any of the method steps illustrated in FIG. 6, or otherwise taught herein, may be used to help configure a storage medium to thereby form a configured medium embodiment.

Conclusion

As described herein, some embodiments provide various tools and techniques to facilitate transitions between parallel and sequential processing. For example, a control parallelism interface and corresponding implementation may allow integration of different parallel constructs, e.g. parallel loops and fork-join blocks, may decouple parallelization policy from the worker code implementing the parallel algorithm, may allow a developer to choose which parallelization policy is used, and may support custom developer-defined parallelization policies.

The control parallelism interface and corresponding implementation can be used with a variety of parallel programming platforms, such as libraries, language extensions, application programs, operating systems, and so on. The control parallelism interface and corresponding implementation can also be used with a variety of parallelization constructs, such as parallel loops, parallel blocks and asynchronous tasks. By using a parallel construct, a developer notifies a parallel engine that a piece of computation can be parallelized in a particular way, e.g., a parallel loop is a loop whose iterations can be executed in parallel. The control parallelism interface and corresponding implementation can be used with parallel constructs, with recursive procedures, and otherwise in a worker program, to make recommendations about parallel versus sequential processing, based on the current state of the worker program and its environment. A recommendation is not necessarily followed, however; the worker program is free to execute code sequentially even when parallel processing is recommended.

Although particular embodiments are expressly illustrated and described herein as methods, configured media, or systems, it will be appreciated that discussion of one type of embodiment also generally extends to other embodiment types. For instance, the descriptions of methods in connection with FIG. 6 also help describe configured media, as well as the operation of systems like those described in connection with FIGS. 1 though 5. It does not follow that limitations from one embodiment are necessarily read into another. In particular, methods are not necessarily limited to the data structures and arrangements presented while discussing systems.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method which may be used by a software developer to configure a program for control parallelism, the method comprising the steps of:
    obtaining a control parallelism interface, namely, obtaining at least one procedure heading for assigning a parallelism policy procedure which implements evaluation of a parallelism condition that is unspecified in the control parallelism interface; and
    using the control parallelism interface to assign at least one parallelism policy procedure in a program, the assigned parallelism policy procedure having a body containing instructions which specify the parallelism condition, the parallelism policy procedure assigned by using at least one of the following actions: calling a factory method to construct a policy procedure instance, instantiating a policy procedure class, linking a policy procedure, setting a policy procedure address pointer, associating a policy procedure body with a policy procedure heading so that invocation based on the policy procedure heading passes control to the policy procedure body.

2. The method of claim 1, further comprising configuring the program to invoke the parallelism policy procedure within a recursive procedure of the program, to thereby limit parallelism during recursion based at least in part on a recommendation from the parallelism policy procedure.

3. The method of claim 1, further comprising configuring the program with a procedure that receives the parallelism policy procedure as a parameter.

4. The method of claim 3, wherein the procedure that receives the parallelism policy procedure as a parameter has an invocation, a heading, and a body, and the method further comprises reconfiguring the invocation to pass in a different parallelism policy procedure as a parameter, without altering the body of the procedure that receives the parallelism policy procedure.

5. The method of claim 1, further comprising configuring the parallelism policy procedure to receive at least one parallelizing assistance value.

6. The method of claim 1, wherein the step of obtaining a control parallelism interface obtains an interface definition which provides a factory method for constructing a parallelism policy procedure as an instance.

7. A computer system configured for parallel processing, the system comprising:
- at least one memory configured with executable instructions;
- a plurality of logical processors configured to execute at least a portion of the instructions in parallel on different logical processors; a control parallelism interface of a parallelism policy object, the control parallelism interface configuring the memory, the control parallelism interface configured for assignment of code which implements evaluation of a parallelism condition that is unspecified in the control parallelism interface; and
- a program configuring the memory and including a procedure having a body containing code which is assigned using the control parallelism interface and includes instructions that specify the parallelism condition, the procedure also having a heading, the code assigned by using at least one of the following actions: calling a factory method to construct a policy procedure instance, instantiating a policy procedure class, linking a policy procedure, setting a policy procedure address pointer, associating a policy procedure body with a policy procedure heading so that invocation based on the policy procedure heading passes control to the policy procedure body.

8. The system of claim 7, wherein the control parallelism interface comprises a max-active-tasks procedure heading for assigning a parallelism policy procedure which implements evaluation of a parallelism condition that is based at least in part on the number of active tasks in the system.

9. The system of claim 7, wherein the control parallelism interface comprises a max-nesting-depth procedure heading for assigning a parallelism policy procedure which implements evaluation of a parallelism condition that is based at least in part on the nesting depth of parallel constructs in the system.

10. The system of claim 7, wherein the control parallelism interface comprises a user-criteria procedure heading for assigning a parallelism policy procedure which implements evaluation of a parallelism condition that is based on at least one user-specified runtime value in the system.

11. The system of claim 7, wherein the program includes an invocation of a parallelism policy procedure within a worker procedure that received the parallelism policy procedure as a parameter.

12. The system of claim 7, wherein the program includes a recursive procedure which is configured in the memory to invoke the parallelism policy procedure.

13. The system of claim 7, wherein the control parallelism interface comprises a more-parallelism-needed procedure heading for invoking a parallelism policy procedure to inquire whether parallelism should be increased in the program.

14. The system of claim 7, wherein the control parallelism interface comprises a procedure heading for passing at least one value into a parallelism policy procedure which is configured to reference the at least one value in a parallelism condition calculation.

15. A storage medium configured with computer data and computer instructions for parallel processing, the method comprising the steps of:
- obtaining a control parallelism interface, namely, obtaining a procedure heading for assigning a parallelism policy procedure which implements evaluation of a parallelism condition that is unspecified in the control parallelism interface;
- using the control parallelism interface to assign a parallelism policy procedure in a program, the assigned parallelism policy procedure having a body containing instructions which specify a parallelism condition, said using step comprising at least one of the following actions: calling a factory method to construct a policy procedure instance, instantiating a policy procedure class, linking a policy procedure, setting a policy procedure address pointer, associating a policy procedure body with a policy procedure heading so that invocation based on the policy procedure heading passes control to the policy procedure body; and
- invoking the parallelism policy procedure during execution of the program.

16. The configured medium of claim 15, wherein the method comprises executing instructions to invoke a given parallelism policy procedure within at least two different parallel constructs in the program.

17. The configured storage medium of claim 15, wherein the obtaining step obtains multiple procedure headings for assigning parallelism policy procedures which implement evaluations of respective parallelism conditions that are unspecified in the control parallelism interface, and the using step uses the control parallelism interface to assign multiple parallelism policy procedures in a program, each of the assigned parallelism policy procedures having instructions which specify a respective parallelism condition.

18. The configured storage medium of claim 15, wherein the method further comprises using a policy instance to create a new policy instance.

19. The configured storage medium of claim 15, further comprising executing a portion of the program in parallel in accordance with a recommendation from the invoked parallelism policy procedure indicating that parallelism is available.

20. The configured storage medium of claim 15, further comprising executing a portion of the program sequentially despite a recommendation from the invoked parallelism policy procedure indicating that parallelism is available.

* * * * *